Sept. 11, 1923.
V. KAPLAN
DIRECTRIX FOR TURBINES AND THE LIKE
Filed Dec. 17, 1914   2 Sheets-Sheet 1
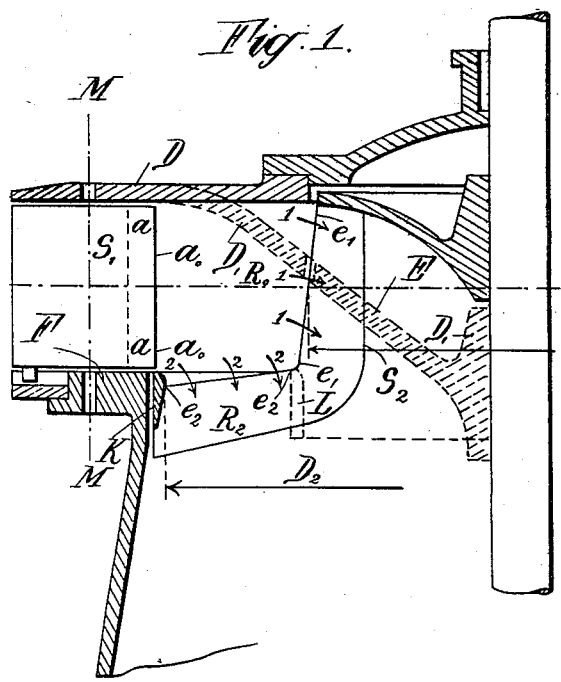
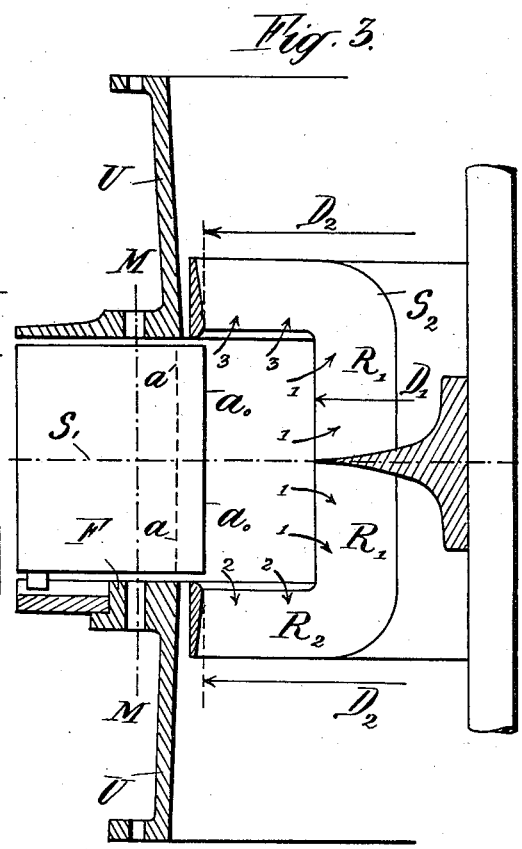
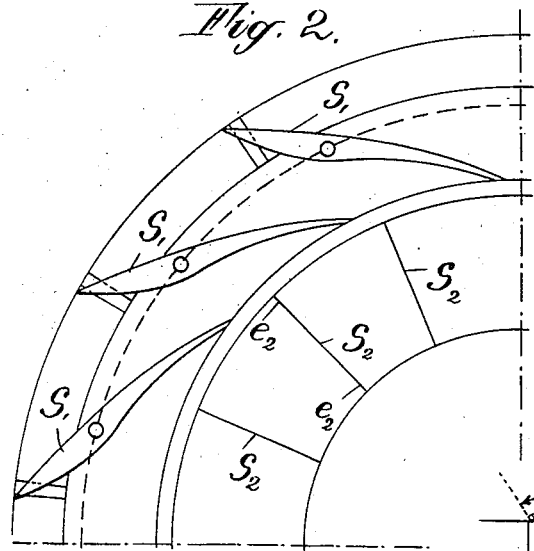
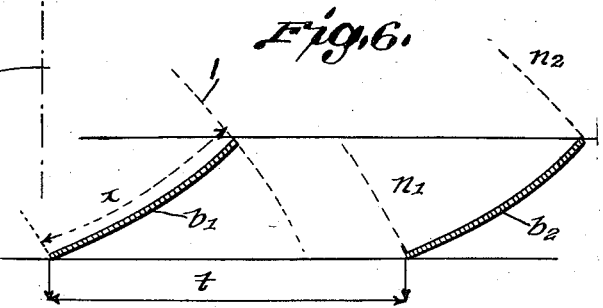
Witnesses:
Inventor:
Dr. Ing. Victor Kaplan Sept. 11, 1923.
V. KAPLAN
DIRECTRIX FOR TURBINES AND THE LIKE
Filed Dec. 17, 1914  2 Sheets-Sheet 2
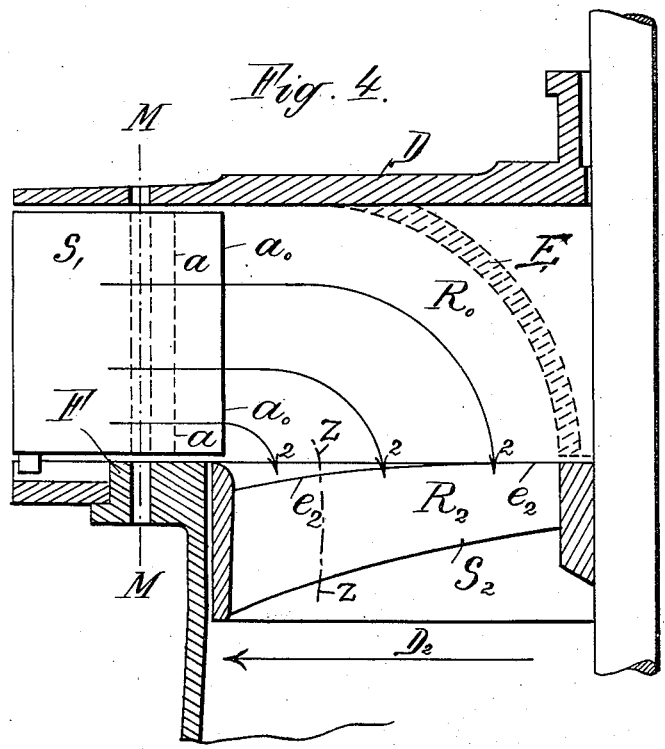
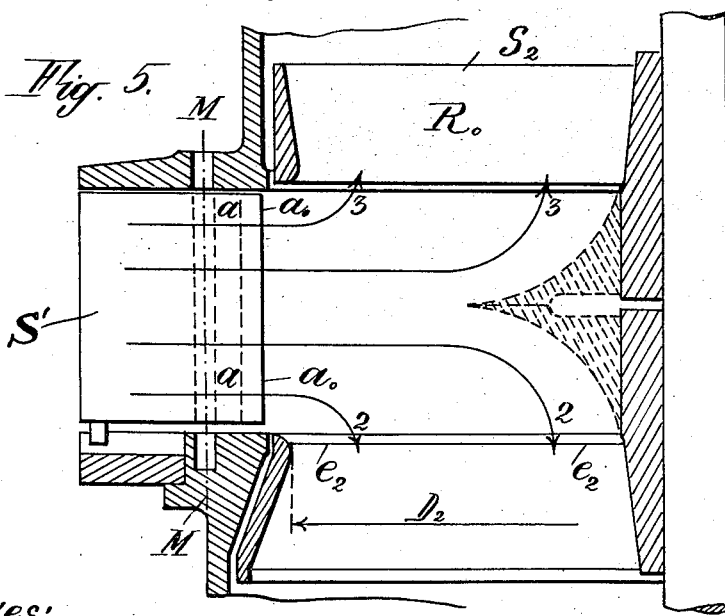

Patented Sept. 11, 1923.

1,467,325

UNITED STATES PATENT OFFICE.

VICTOR KAPLAN, OF BRUNNE, AUSTRIA.

DIRECTRIX FOR TURBINES AND THE LIKE.

Application filed December 17, 1914. Serial No. 877,782.

*To all whom it may concern:*

Be it known that I, Dr. VICTOR KAPLAN, a subject of the Emperor of Austria, and resident of Brunne, Austria, have invented certain new and useful Improvements in Directrixes for Turbines and the like (for which I have filed an application in Germany Sept. 23, 1914), of which the following is a specification.

In my application Serial No. 803,334 filed Nov. 26, 1913 (Patent 1,399,059), I have described a turbine machine (water, steam or gas-turbine, turbine pump or blower), the guide wheel of which is arranged in such a manner, that the fluid enters or leaves the guide wheel in a radial or substantially radial direction. The runner wheel of the said machine is wholly or for the most part provided with axial flow runner spaces, located at a convenient distance below the lower edges of the guide vanes. If therefore the turbine works for instance as a water turbine, the water must be materially deflected between the guide vanes from its radial entrance direction, because the water can also leave the guide vanes between their lower edges.

If the turbine is adapted for a pump, I have shown in my said application, that only a reverse of flow is required. The major amount of fluid flows through the runner wheel in a substantially axial direction, and is deflected into the guide wheel and leaves said wheel in a substantially radial direction.

The advantages produced by such a combination may briefly be characterized as an improvement of the guiding of the fluid and a reduction of its frictional resistances. The principal object of my present invention is to reduce still further the frictional resistances and thus to increase the specific number of revolutions. Another object is to prevent as far as possible the lowering of the efficiency, if the admission of fluid changes from time to time. A further object is to simplify the manufacture of the guide vanes, and to reduce the power needed for the adjusting of the regulating means.

These improvements are obtained through a special arrangement and shape of the space adjacent to the outlet edges of the guide vanes and by avoiding the usual cell-shaped form, at least along a part of the blades of the runner wheel, as is hereinafter fully described, illustrated in the accompanying drawings, and pointed out in the appended claims.

In the drawings:

Fig. 1 shows a section through the left hand side of a water turbine. The guide wheel consists of a series of movable guide vanes $S_1$. The runner wheel is a combination of a Francis-turbine-wheel and a Jonval wheel. Fig. 2 is a plan view of said turbine from which the wheel-cover plate D (Fig. 1) has been removed. Fig. 3 shows the left hand side of a twin turbine wheel also chiefly provided with axial-flow runner spaces ($R_2$). Fig. 4 shows the combination of a radial flow guide wheel and an axial flow runner wheel. Fig. 5 is a twin turbine showing a radial flow guide wheel and two axial flow runner wheels. Fig. 6 is the section of a flow surface ($z\ z$ Fig. 4) with two adjacent runner blades spread out in a plane.

The representation of the Figures (1–5) is nearly the same as that shown in my above said prior application, the novel features only are specifically shown. To simplify the specification the following description chiefly refers to water turbines, but it is clear that my invention can also be utilized for all other kinds of turbines, such as above mentioned.

It is well-known that the frictional losses depend not only on the area of the wetted blade surface, but also on the length of the hydraulic flow. For this reason the frictional losses are the greater, the shorter the distance chosen between the outer edges of the guide vanes and the turbine axis, because the clearance between the vanes diminishes towards the axis.

A diminution of the friction losses can therefore be obtained, if in a runner wheel of my said prior application the fluid is admitted by a guide wheel provided with vanes, the lower edges of which do not project materially or not at all over the wall of the suction tube. It is known that such a guide wheel is adapted for radial turbines and also for Francis-turbines. The guide vanes $S_1$ thereon are generally movable as is indicated in Figs. (1–5), for the purpose of regulating the admission of water. But a distinct difference between the guide vanes shown in my said prior application and those of my present invention will be seen in the drawings, because of the fact, that the outlet edges $a_0\ a_0$ of the guide vanes reach only so far towards the wall of the suction pipe, that the discharge of water from the lower edges of said vanes can be largely or wholly avoided.

The runner wheel used in my present invention does not differ in any way from that fully described in my said prior application.

Fig. 1 shows the combination of an axial flow and a radial flow runner wheel, the blade spaces of which are indicated by the letters $R_2$ and $R_1$. It will be seen by the imaginary rim L shown in broken lines, that this runner wheel is sub-divided into two well-known turbine wheels, of which the one, adapted with the radial flow runner spaces $R_1$ is similar to a "Francis-wheel," while the other provided with the axial flow spaces $R_2$ resembles a "Jonval-wheel."

In my said prior application, the radial flow runner spaces $R_1$ are so insignificant that they may be quite dispensed with, as is indicated in Figs. 4 and 5 of the drawings of the present application. With such a combination of a guide wheel and a runner wheel the flow of fluid proceeds as follows:

Owing to the guide vanes $S_1$ the water is forced to leave the outlet edges of the guide vanes by the outlet angles, required for a smooth flow, and to enter the space $R_0$ in a substantially radial direction, that is with a meridian velocity having the same direction. In said space either the major portion or the whole amount of water is deflected from its radial entrance direction, and flows in a substantially axial direction into the runner wheel. If a single runner wheel is provided as is shown in Figs. 1 and 4, the above mentioned deflection is indicated by the arrows 2. In a twin turbine (Figs. 3 and 5) said deflection is indicated by the arrows 2 and 3. Only in the case of a combined axial and radial flow wheel (Figs. 1 and 3) an insignificant part of the water flows in a substantially radial direction into said wheel, as is indicated by the arrows 1. Having imparted its energy to the runner wheel, the water flows through the suction pipe into the waste channel. Since a high specific number of revolutions produces great "discharge losses" so called, it is clear that a sufficient recovery of energy must be provided for by the employment of suitable suction pipes. The working of said pipes may be improved by the utilization of the centrifugal forces of the water. Therefore, a characteristic feature of my invention is the deflection of water into the bladeless space $R_0$, whereby the major portion or the entire amount of water changes its direction approximately ninety degrees, without the losses hitherto caused by the usual arrangement of blades in said space. I have found through theory and provided by experiments that such a deflection of fluid corresponds in all cases to the natural flow of fluid, or in other words, such a deflection occurs if the fluid enters a tube, without arrangement of special guide surfaces, and therefore a material reduction of losses caused by friction can be obtained. Although in such a case the admission of water into the runner wheel cannot be realized without eddies and shock, especially near the turbine axis, still in many cases such an arrangement can be advantageous by tending to prevent as far as possible the lowering of the efficiency if the admission of water changes from time to time. It is known for example, that in many turbine plants, the amount of water needed is not always available, and therefore if a large range of water consumption is required a turbine having a lower maximum efficiency but a higher mean efficiency is superior to a turbine having a higher maximum efficiency but a lower mean efficiency. This superiority becomes the greater, the greater the difference between the maximum water supply and the minimum water supply.

Such a higher average efficiency can be obtained by the arrangement of the outlet edges of the guide vanes as described above, because in such a case, the lower edges of said vanes do not materially guide the water into the runner wheel, and therefore if such guide vanes are turned, the deviation of the arrangement of the angles of the lower edges can no longer influence, in their new position, the flow of fluid. Another advantage of the arrangement of the guide vanes above mentioned is the increase of the specific number of revolutions, produced by the diminution of the friction losses.

For practical purposes such shortened guide vanes have the further advantages of a simple and inexpensive construction, and also the working of the regulating means becomes easier, because the position of the vane bolts can be always chosen in such a way, that the resulting water pressure on said vanes can be applied near said bolts. This is of especial importance with automatical regulating devices.

If the fluid not only in its course to the runner wheel, but also in the spaces of said wheel meets with those resistances, which result under all circumstances for the necessary guiding of the fluid along the blades, it will be seen by such a flow that the raising of the specific number of revolutions can be increased to the limits of possibility. The usual opinion that the fluid must be guided only in channel-shaped spaces (cells) cannot be maintained any longer.

In my application Serial Nr. 865,208 filed Oct. 5, 1914, I have shown precisely that the peripheral length (Fig. 6) of a blade section ($b_2$) can be so much reduced in comparison to the blade spacing $t$ that the trajectories ($n_1$ and $n_2$) drawn normal to the flow lines do not intersect the adjacent blade section $b_1$. In such a case the usual form of a "clear width between two buckets" does not exist, and therefore the blade spaces lose their usual cell-shaped form forming instead an elongated passage-way. Notwithstanding this change of form, a practical guiding of fluid can be arranged having the additional advantage, that the frictional resistances are materially reduced. The combination of a series of such runner blades with the bladeless space $R_0$, allowing the deflection of fluid above described, results in the highest possible specific number of revolutions.

It is well-known, that many water courses cannot be utilized for the reason, that the specific number of revolutions of the turbine hitherto reached is too small, and low speeds require expensive machinery and buildings. But according to my invention, the utilization of such water courses is possible, because the increase in speed allows an economical working. But also in those cases, in which an economical water supply is less important than the attainment of a high number of revolutions, it must be admitted that if the specific speed of the turbine can be suitably increased, the utilization of such water courses remains economical even with the smallest head.

It is evident, that the advantages described above do not depend on a strictly defined position of the outlet edges $a_0$ $a_0$ of the guide vanes $S_1$. The desired attainment of the natural deflection of the fluid can also be realized if the said edges are located as shown by the broken lines $a$ $a$ (Fig. 1), or if said edges are curved. Also it is immaterial whether said vanes are fixed or movable if at least the major part of fluid is deflected about ninety degrees in the bladeless space $R_0$. The same holds good for the entrance edges ($e_1$ $e_1$ Fig. 1 and $e_2$ $e_2$ Figs. 1, 2, 4 and 5) of the runner blades.

In my prior application Serial Nr 803,334 it is clearly shown that said deflection can always be attained if the outlet diameter $D_2$ of the axial flow runner spaces $R_2$ (Figs. 1, 3, 4 and 5) is suitably increased in relation to the outlet diameter $D_1$ of the radial flow runner spaces $R_1$ (Figs. 1 and 3), or if the latter spaces are wholly or nearly wholly discarded (Figs. 4 and 5).

The form and shape of the bladeless space $R_0$ does not depend on a special curvature of the cover plate D. This will be seen in Figs. 1 and 4 by the full lines representing a plain cover plate D and by the broken lines representing a curved cover plate E. The latter allows the use of a suitable bearing of the runner shaft and increases the specific speed by reducing the radial flow runner spaces as is indicated in Fig. 1 by the modified wheel cover plate E shown in broken lines. In a twin turbine a hub substantially triangular in cross section may be arranged for the purpose of obtaining a suitable subdivision of the water flow, as is indicated in Fig. 5 by the broken lines.

A turbine according to my invention can be utilized in all cases, if a regular flow of fluid is obtained by suitable guide surfaces, both into the guide wheel and also into the runner wheel. Such a regular flow can be obtained not only with all kinds of turbines (water, steam, or gas turbine) but also with all kinds of modern turbine pumps or blowers. Also it is clear that the guide wheel and the runner wheel of said machines must be accommodated to the nature of the driving means (liquid, steam, gas, or the like), without changing the characteristic features of my invention. Also it is clear, that the direction of the flow of fluid through the impeller must be reversed, if my invention is adapted for a pump, and therefore the "outlet edges" of the pumps correspond to the "entrance edges" of the turbines and conversely.

I claim as my invention:

1. In a turbine including a suction pipe the combination of a guide wheel and a runner wheel, the latter provided with substantially axial flow runner spaces, into which the fluid is admitted by a substantially radial flow guide wheel, the guide vanes thereon projecting slightly or not at all over the wall of the suction pipe, thus providing a bladeless space in which the major part or the whole amount of fluid can be deflected about ninety degrees.

2. In a turbine including a suction pipe the combination of a guide wheel and a runner wheel, the latter comprising an upper and a lower set of runner blades forming substantially axial flow blade spaces between each other into which the fluid is admitted by a radial flow guide wheel, the guide vanes thereon projecting slightly or not at all over the wall of the suction pipe, thus providing a bladeless space in which the major part, or the whole amount of fluid can be deflected about ninety degrees.

3. In a turbine including a suction pipe the combination of a distributor for Francis-turbines and a runner wheel comprising a hub and a series of substantially axial flow runner blades arranged round said hub and rigidly secured therein extending substantially in a radial direction towards the wall of the suction pipe, the guide vanes projecting slightly or not at all over the wall of said pipe, thus providing a bladeless space in which the major part or the whole amount of fluid can be deflected about ninety degrees.

4. In a turbine the combination of a distributor for Francis-turbines, a suction pipe adapted for a suitable conversion of energy, and a runner wheel comprising a hub and a series of substantially axial flow runner blades, the guide vanes projecting slightly or not at all over the wall of the suction pipe, thus providing a bladeless space in which the major part or the whole amount of fluid can be deflected about ninety degrees.

5. In a turbine including a suction pipe the combination of a guide wheel, and a substantially axial flow runner wheel, the latter provided with runner blades, the blade spacing of which is so arranged in relation to the true length of the blade profile, that an elongated passageway is formed, at least along a part of the blade surface, the guide vanes projecting slightly or not at all over the wall of the said suction pipe, thus providing a bladeless space in which the major part or the whole amount of fluid can be deflected about ninety degrees.

6. In a turbine including a suction pipe the combination of a guide wheel, and an impeller, the latter comprising a hub and a series of substantially axial flow impeller blades, arranged round said hub and rigidly secured therein, the guide vanes projecting slightly or not at all over the wall of the said suction pipe thus providing a bladeless space in which the major part or the whole amount of fluid can be deflected about ninety degrees.

7. In a turbine including a suction pipe the combination of a guide wheel, and an impeller, the latter comprising a hub and a series of impeller blades, the blade spacing of which is so arranged in relation to the true length of the blade profile, that an elongated passageway is formed, at least along a part of the blade surfaces, the guide vanes projecting slightly or not at all over the wall of the said suction pipe, thus providing a bladeless space in which the major part or the whole amount of fluid can be deflected about ninety degrees.

In testimony whereof I have hereunto set my hand in the presence of two subscribing witnesses.

PROF. DR. ING. VICTOR KAPLAN.

Witnesses:
KARL KISLINGER,
HUGO THORNE.